(12) United States Patent
Garver et al.

(10) Patent No.: US 6,324,283 B1
(45) Date of Patent: Nov. 27, 2001

(54) PROTECTOR INTERFACE

(75) Inventors: William Joseph Garver; Sam Donovich; John Wesley Hall, Jr., all of Harrisburg, PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 08/992,158

(22) Filed: Dec. 17, 1997

(51) Int. Cl.$^7$ .................................................. H04M 9/00
(52) U.S. Cl. ............................................. 379/412; 379/437
(58) Field of Search ................................... 379/412, 399, 379/437; 361/119, 118, 120

(56) References Cited

U.S. PATENT DOCUMENTS

| | | | |
|---|---|---|---|
| 4,903,295 | * 2/1990 | Shannon et al. | 379/412 |
| 5,313,519 | 5/1994 | Mickelson et al. | 379/399 |
| 5,333,193 | 7/1994 | Cote et al. | 379/399 |
| 5,341,270 | * 8/1994 | Kaczmarek | 361/119 |
| 5,373,413 | 12/1994 | Shannnon et al. | 361/119 |
| 5,416,837 | 5/1995 | Cote et al. | 379/399 |
| 5,438,619 | 8/1995 | Shannon et al. | 379/399 |
| 5,479,505 | 12/1995 | Butler et al. | 379/412 |
| 5,497,416 | 3/1996 | Butler, III et al. | 379/399 |
| 5,523,916 | * 6/1996 | Kaczmarek | 361/119 |
| 5,548,641 | 8/1996 | Butler et al. | 379/399 |
| 5,557,065 | 9/1996 | Brower et al. | 174/523 |
| 5,570,422 | 10/1996 | Napiorkowski et al. | 379/399 |

* cited by examiner

*Primary Examiner*—Stella Woo

(57) ABSTRACT

Replaceable surge protector assemblies suitable for telephone network interfaces. It has a surge suppresser element covered by a receptacle. In one embodiment the receptacle has an electrically insulating, hollow housing having a top, a floor, opposing side walls, a closed end and an open end defining a central cavity having inside walls. A slot extends through the floor from the open end a part of the distance toward the closed end. A handle projects outwardly from the top. In another embodiment, the receptacle has an electrically insulating, hollow housing element having a tops opposing side walls, opposing ends and an open bottom defining an central cavity. An electrically insulating floor element mates with the open bottom of the housing. The floor element has at least one opening through the floor for receiving wire leads therethrough.

Means are provided for attaching the floor element to the housing element at the open bottom. A handle also projects outwardly from the top. The surge suppresser assembly plugs into spring connectors in an electrical panel or printed circuit board such as may be used as a telephone network interface.

12 Claims, 3 Drawing Sheets

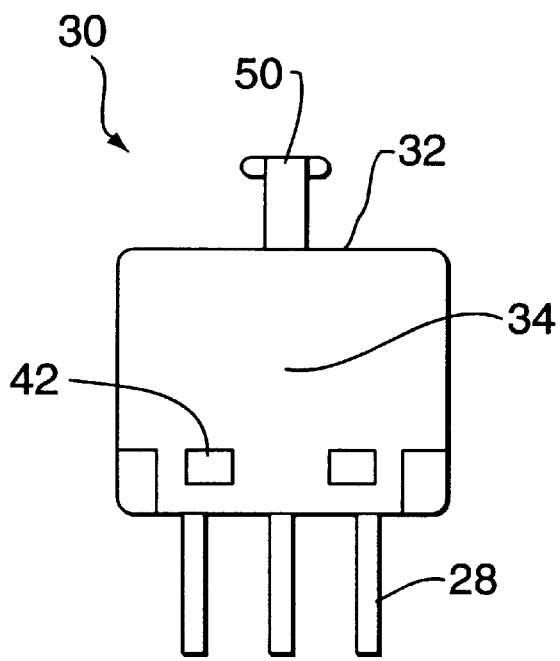
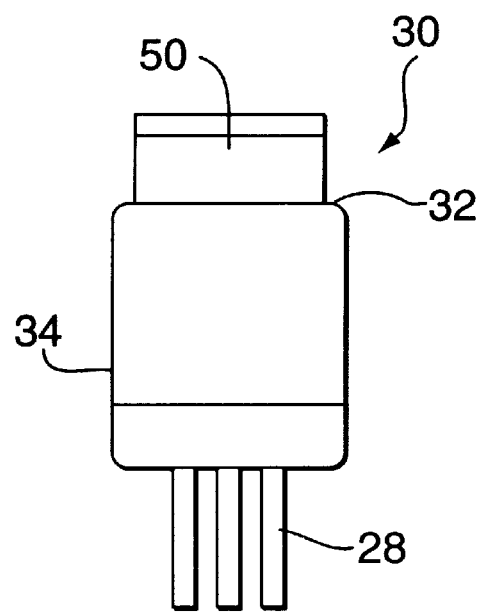
FIG. 3
FIG. 4
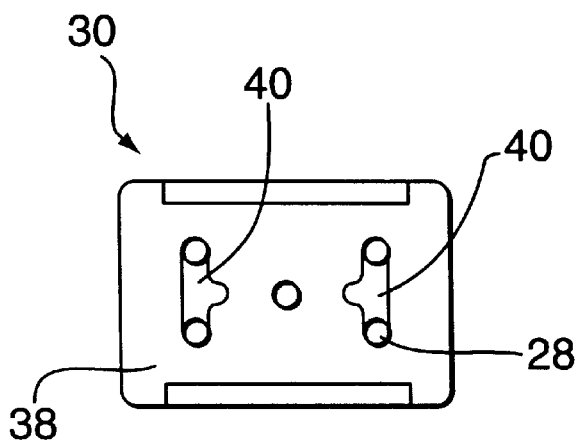
FIG. 5

PROTECTOR INTERFACE

BACKGROUND OF THE INVENTION

1. Field of the Invention

The present invention relates to surge suppressers or more particularly to replaceable surge protector assemblies for telephone network interfaces.

2. Description of the Prior Art

Telephone network interface devices are well known in the art. Such equipment connects telephone company wiring to wiring serving individual telephone subscribers. Typical telephone network interface devices are described in U.S. Pat. Nos. 5,570,422; 5,416,837; 5,497,416; 5,479,505; and 5,333,193. The telephone network interface devices typically comprises a plurality of terminals in arranged in an array for connecting to several incoming telephone lines from a telephone company. These lines are then connected to complementary wiring in a house or office via the interface. In the usual case, the terminals are protected with a surge suppresser for grounding unexpected current surges. Such cause a short circuit to ground for a current overload condition which may be caused by a lightning strike. The interface changes from a first state which allows normal telephone current to proceed through the interface to a second state during an electrical surge condition. Normally a short circuit to ground is created during a surge to protect electrical components from damage. Protected telephone network interface devices are known from U.S. Pat. Nos. 5,3313,519; 5,438,619; 5,557,065; 5,548,641 and 5,373,413.

A key problem with prior art surge suppressers is that they are only useful for a single lightning hit. Once lightning hits, the telephone network interface device is expended and must be entirely replaced This may cause an outage in telephone service for a considerable length of time. The principal reason interfaces are expended is because gas filled surge suppressing elements are hard wired to the interface device. In addition, due to their very small size, handling such elements has been difficult. It would be desirable to provide a telephone network interface device which has pluggable, surge suppressing elements which are easily replaceable in an interface which has been hit by lightning. In this way repair is simplified, expedited and much less costly. While replaceable, pluggable surge suppressers are known for other applications, such are inconvenient for telephone interface applications due to restrictive space requirements and handling difficulties.

The present invention provides a holder which both protects the surge suppressing elements and makes them easier to handle.

SUMMARY OF THE INVENTION

The invention provides a receptacle for a surge suppresser which comprises an electrically insulating, hollow housing having a top, a floor, opposing side walls, a closed end and an open end defining a central cavity having inside walls, a slot through the floor extending from the open end a part of the distance toward the closed end; and a handle projecting outwardly from the top.

The invention also provides a receptacle for a surge suppresser which comprises an electrically insulating, hollow housing element having a top, opposing side walls, opposing ends and an open bottom defining an central cavity; an electrically insulating floor element which mates with the open bottom of the housing, said floor element having at least one opening through the floor for receiving wire leads therethrough; means for attaching the floor element to the housing element at the open bottom; and a handle projecting outwardly from the top.

The invention further provides a pluggable surge suppresser assembly comprising a receptacle as above and a surge suppresser having a plurality of wire leads extending outwardly therefrom; the surge suppresser being mounted in the cavity such that the leads extend through and out of the floor slot or opening.

The invention still further provides an electrical panel comprising an electrically insulating platform, a plurality of electrically conducting spring connectors mounted through the platform, which spring connectors are capable of removably grasping a wire lead therein; and at least one of the above pluggable surge suppresser assemblies plugged into the platform, the surge suppresser assembly being plugged into the platform by means of the wire leads being removably grasped by the spring connectors.

The invention yet further provides a telephone network interface having surge protection which comprises (a) an electrically insulating platform, (b) a plurality of telephone line tip and ring connectors on the platform;

(c) a plurality of electrically conducting spring connectors mounted through the platform, which spring connectors are capable of removably grasping a wire lead therein;

(d) an electrical connection between each of the telephone line tip and ring connectors and one each of the spring connectors; and (e) a plurality of the above pluggable surge suppresser assemblies plugged into the platform, one assembly connected between one each of the tip and ring connectors and a ground connection; each surge suppresser assembly being plugged into the platform by means of the wire leads being removably grasped by the spring connectors.

BRIEF DESCRIPTION OF THE DRAWINGS

FIG. 3 shows a side view of a surge suppresser assembly having a pressed together two piece receptacle enclosing a three lead surge suppresser element.

FIG. 4 shows an end view of the surge suppresser assembly of FIG. 3.

FIG. 5 shows a bottom view of the surge suppresser assembly of FIG. 3.

DETAILED DESCRIPTION OF THE PREFERRED EMBODIMENT

Figure 1:
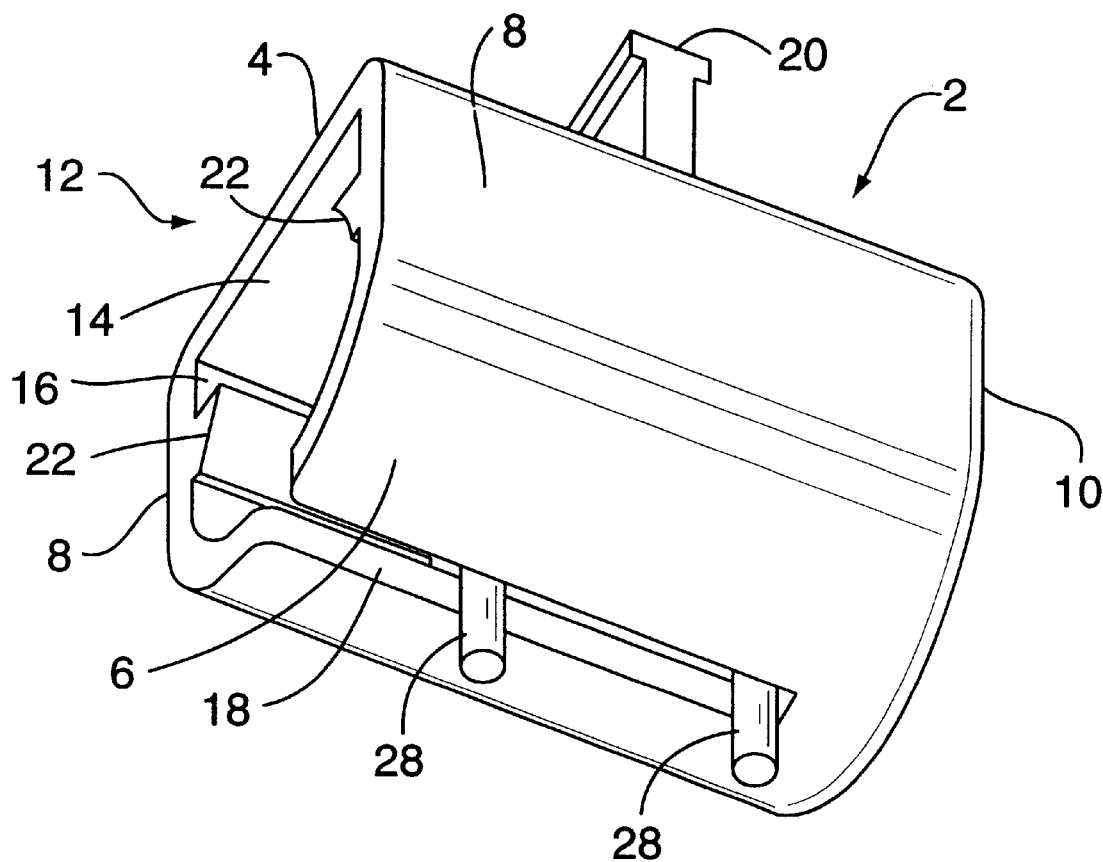
FIG. 1 shows one embodiment of a receptacle for a surge suppresser according to the invention.
Figure 2:
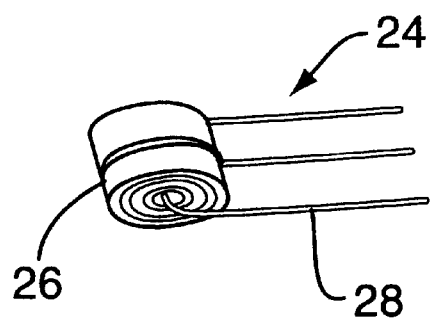
FIG. 2 shows a three lead surge suppresser element.

Referring to FIG. 1, there is shown a receptacle 2 for a surge suppresser according to the invention. It which comprises an electrically insulating, hollow housing having a top 4, a floor 6, opposing side walls 8, a closed end 10 and an open end 12 defining a central cavity 14. Central cavity 14 has inside walls 16, and a slot 18 through the floor. The slot extends from the open end 12 a part of the distance toward the closed end 10. On the top is a handle 20. Preferably the floor 6 is rounded as shown. Preferably the receptacle has means for holding a surge suppresser within the cavity. Such may include at least one, and preferably a pair of projections 22 extending from the inside walls into the cavity 14. A surge suppresser assembly comprises a surge suppresser positioned within the receptacle. Surge suppressers themselves are well known in the art and are shown in FIG. 2. Typically a surge suppresser element 24 comprises an enclosed ceramic tube 26, having two, three or more wire leads 28 having an end within the enclosed tube. The composition in the tube conducts electricity between the wire leads upon application of a threshold electrical current or voltage applied to at least one of the wire leads. Typically the composition is a gas which ionizes and conducts electricity between the wire leads upon application of a threshold electrical current or voltage applied to at least one of the wire leads. The surge suppresser assembly is formed when the surge suppresser element 24 is inserted into the receptacle. The wire leads 28 are shown extending from slot 18 in FIG. 1. The surge suppresser elements are themselves commercially available from Shinko Electric Industries Co., Ltd.

In another embodiment of the invention, the assembly comprises two mating receptacles as described above. The receptacles matingly engage such that the surge suppressor is mounted in the cavity of each receptacle and the leads extend through the slots 18. Mating may be by any means known in the art such as a press fit or slide fit of one receptacle around another. Alternatively they can be adhered or otherwise joined by any means known to the skilled artisan.

FIGS. 3, 4 and 5 show an alternate embodiment of the a surge suppresser assembly showing a two piece pressed together receptacle 30. The receptacle comprises an electrically insulating, hollow housing element having a top 32, opposing side walls 34, opposing ends 36 and an open bottom defining an central cavity. An electrically insulating floor element 38 mates with the open bottom of the housing. Floor element 38 has at least one and preferably more than one opening 40 through the floor for receiving wire leads 28 therethrough. Means 42 are provided for attaching the floor element to the housing element at the open bottom. Preferably such may be a detent on the floor element which projects into an opening in the housing element, or vice versa. Alternatively the attaching may be done by a hinge and clip as is well known in the art. A handle 50 projects outwardly from the top to aid manual placement of the assembly.

The receptacle material can be any convenient composition which is a good electrical insulator and which meets the Underwriters Laboratories VO 54 flame retardancy standards. A preferred insulating material is available as Valox from the General Electric Company.

Figure 6:
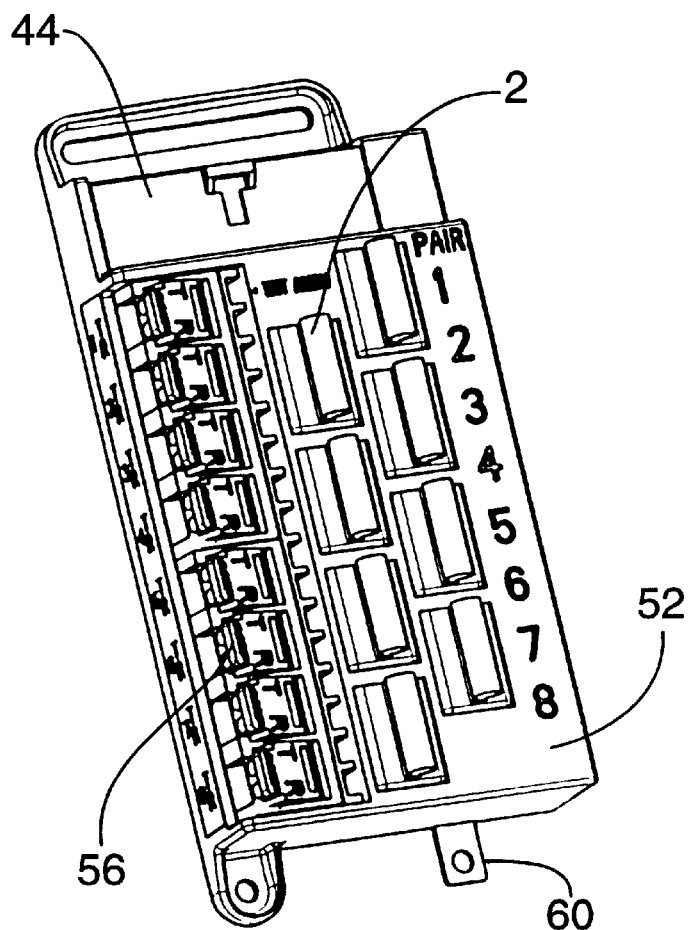
FIG. 6 shows a telephone network interface device according to the invention.
Figure 8:
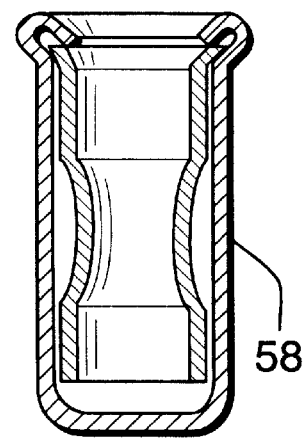
FIG. 8 shows a spring connector for a wire lead.
Figure 7:
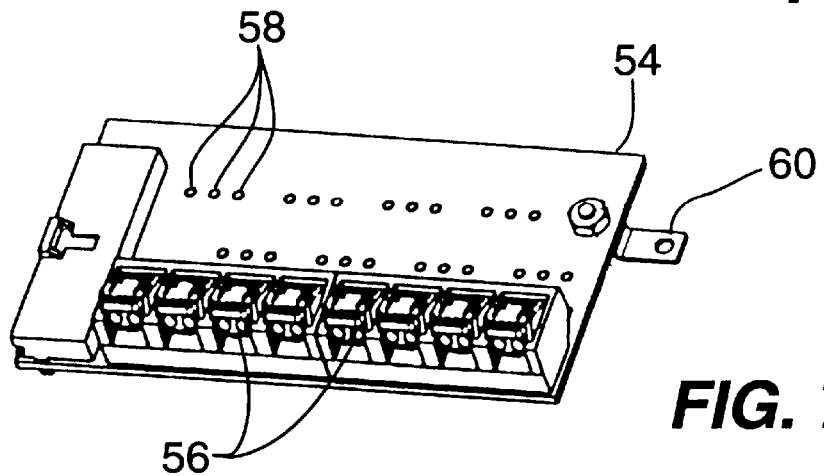
FIG. 7 shows an electrical panel according to the invention.

FIGS. 6 and 7 show a telephone network interface device according to the invention It comprises a housing 52 covering an electrically insulating platform or other electrical panel 54. On the platform are a plurality of telephone line tip and ring connectors such as rocker connectors 56 which feed telephone service to a connector 44 to the subscriber lines. On the platform are several drilled holes which each contain electrically conducting spring connectors 58 mounted therethrough. Typical spring connectors are shown as 58 in FIG. 8. The spring connectors are capable of removably grasping a wire lead therein. The connectors may have a closed bottom, an open bottom or a knockout bottom. Such are available commercially as Miniature Spring Sockets from AMP, Incorporated of Harrisburg, Pa. An electrical connection is formed between each of the telephone line tip and ring connectors and one each of the spring connectors. This may be done typically by wires or printed metallic connecting lines on the back side of the platform 54. The surge suppresser assemblies such as 2 or 30 are plugged then into the platform 54, one assembly connected between one each of the tip and ring connectors and a ground connection 60. In the usual case a surge suppresser is connected between tip to ground, between ring to ground and between power to ground. A two wire surge suppresser can make one of these connections; a three wire surge suppressser can make two of these connections, etc. FIGS. 6 and 7 show an array of eight surge suppresser assemblies, but it is understood that the number may be any quantity desired by the skilled artisan. Each surge suppresser assembly 2 is plugged into the platform 54 by means of the wire leads 28 being pressed down into and removably grasped by the spring connectors 58.

What is claimed is:

1. A receptacle for a surge suppresser which comprises an electrically insulating, hollow housing having a top, a floor, opposing side walls, a closed end and an open end defining a central cavity having inside walls, a slot through the floor extending from the open end a part of the distance toward the closed end; and a handle projecting outwardly from the top.

2. The receptacle of claim 1 wherein the floor is rounded.

3. The receptacle of claim 1 further comprising means for holding a surge suppresser within the cavity.

4. The receptacle of claim 1 further comprising at least one projection extending from the inside walls into the cavity capable of holding a surge suppresser within the cavity.

5. The receptacle of claim 1 further comprising a pair of projections extending from the inside walls into the cavity capable of holding a surge suppresser within the cavity.

6. A pluggable surge suppresser assembly comprising
   (a) a receptacle which comprises an electrically insulating, hollow housing having a top, a floor, opposing side walls, a closed end and an open end defining a central cavity having inside walls, a slot through the floor extending from the open end a part of the distance toward the closed end; and a handle projecting outwardly from the top;
   (b) a surge suppresser having a plurality of wire leads extending outwardly therefrom; the surge suppresser being mounted in the cavity such that the leads extend through and out of the slot.

7. The assembly of claim 6 wherein the surge suppresser completes an electrical circuit through the wire leads upon the application of a sufficient amount of current.

8. The assembly of claim 7 wherein the surge suppresser comprises an enclosed tube, said wire leads having an end within the enclosed tube, and a composition in the tube which conducts electricity between at least two of the wire leads upon application of a threshold electrical current or voltage applied to at least one of the wire leads.

9. The assembly of claim 7 wherein the surge suppresser comprises an enclosed tube, said wire leads having an end within the enclosed tube, and a gas in the tube which ionizes and conducts electricity between at least two of the wire leads upon application of a threshold electrical current or voltage applied to at least one of the wire leads.

10. The assembly of claim 6 further comprising a second receptacle which comprises a second electrically insulating hollow housing having a second top, a second floor, second opposing side walls, a second closed end and a second open end defining a second central cavity having second inside walls, a second slot through the second floor extending from the second open end a part of the distance toward the second closed end; and a second handle projecting outwardly from the second top; the receptacle and the second receptacle being matingly engaged such that the surge suppresser is mounted in the cavity and the second cavity such that at least one lead extends through and out of the slot and at least one lead extends through and out of the second slot.

11. A telephone network interface having surge protection which comprises:

(a) an electrically insulating platform, (b) a plurality of telephone line tip and ring connectors on the platform;

(c) a plurality of electrically conducting spring connectors mounted through the platform, which spring connectors are capable of removably grasping a wire lead therein;

(d) an electrical connection between each of the telephone line tip and ring connectors and one each of the spring connectors; and (e) a plurality of pluggable surge suppresser assemblies plugged into the platform, each of the assemblies connected between one each of the tip and ring connectors and a ground connection; each said surge suppresser assembly comprising:

a receptacle which comprises an electrically insulating, hollow housing having a top, a floor, opposing side walls, a closed end and an open end defining a central cavity having inside walls, a slot through the floor extending from the open end a part of the distance toward the closed end; and a handle projecting outwardly from the top; and a surge suppresser having a plurality of wire leads extending outwardly therefrom; the surge suppresser being mounted in the cavity such that the leads extend through and out of the slot;

each said surge suppresser assembly being plugged into the platform by means of the wire leads being removably grasped by the spring connectors.

12. The telephone network interface of claim 11 wherein the surge suppresser comprises an enclosed tube, said wire leads having an end within the enclosed tube, and a gas in the tube which ionizes and conducts electricity between at least two of the wire leads upon application of a threshold electrical current or voltage applied to at least one of the wire leads.

* * * * *